| United States Patent [19] | [11] | 4,147,828 |
|---|---|---|
| Heckel et al. | [45] | Apr. 3, 1979 |

[54] TUMBLING AND EXERCISE MAT

[75] Inventors: Klaus Heckel, Weinheim an der Bergstrasse; Friedemann Klaffke, Gorxheimertal; Walter Umann, Weinheim an der Bergstrasse, all of Fed. Rep. of Germany

[73] Assignee: Firma Carl Freudenberg, Weinheim an der Bergstrasse, Fed. Rep. of Germany

[21] Appl. No.: 813,996

[22] Filed: Jul. 8, 1977

[30] Foreign Application Priority Data

Jul. 10, 1976 [DE] Fed. Rep. of Germany ... 7621838[U]

[51] Int. Cl.² .............................................. B32B 3/26
[52] U.S. Cl. ....................................... 428/255; 5/344; 272/109; 428/310; 428/315

[58] Field of Search ..................... 428/71, 76, 68, 310, 428/315, 95, 131–137, 158, 159, 255, 256, 284–287; 5/344; 272/93, 101, 109

[56] References Cited

FOREIGN PATENT DOCUMENTS 1294606 11/1972 United Kingdom ..................... 428/315

Primary Examiner—William J. Van Balen
Attorney, Agent, or Firm—Sprung, Felfe, Horn, Lynch & Kramer

[57] ABSTRACT

A lightweight exercise and tumbling mat comprises a core composed of a closed-cell foamed synthetic material with soft elastic properties. A textile sheet and/or film is disposed on the top surface of the core and a nonskid sheeting of rubber or synthetic material is disposed on the underside of the core.

3 Claims, 1 Drawing Figure

U.S. Patent
Apr. 3, 1979
4,147,828
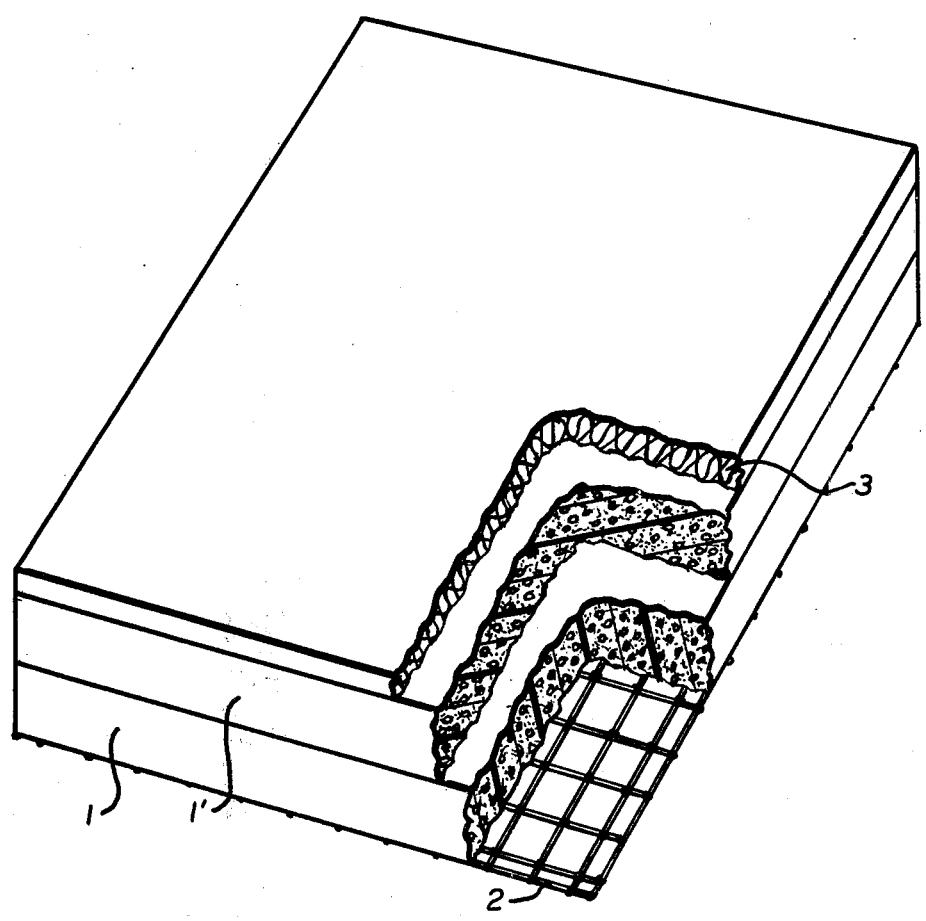

TUMBLING AND EXERCISE MAT

BACKGROUND OF THE INVENTION

The present invention relates to an exercise and tumbling mat of very low weight, in particular for school sports.

To avoid injuries in gymnastics with and without the use of equipment, gym mats, as is well known, are used. These commonly consist of a core of a thick layer of foam rubber or fiber which externally is surrounded with fabric or with an artificial leather covering. The mechanical and dynamic properties of these mats have commonly been independent of their particular position. This apparent advantage, however, of necessity entails various disadvantages.

First of all, in this connection, one disadvantage that should be mentioned is the considerable weight of such mats resulting from their two-sided symmetrical structure.

Since their use is essentially a question of their transportability by children, the relatively great weight has of necessity imposed size limitations of relatively small dimensions, so that in practical use from time to time several individual mats have had to be combined into a single unit. A known disadvantage of this has consisted in that the individual mats herein frequently tended to slip, often leading to injuries, in particular because of the great difference in level between the top edge of the mat and the surrounding floor.

SUMMARY OF THE INVENTION

The object of this innovation is to develop a tumbling and exercise mat which overcomes the difficulties mentioned above and which, with good dynamic cushioning action, is characterized in particular by as small as possible a weight per unit area.

This object is accomplished pursuant to the present invention by a gym mat comprising a core plate of a closed-cell foamed synthetic material with soft elastic properties which on the surface has a textile sheeting and/or a film while its underside is covered with a non-skid sheeting or netting of rubber or synthetic material.

According to a particular embodiment it is provided that the core plate comprises a plurality of layers laminated together which with regard to their dynamic cushioning action have different properties. It has been shown to be particularly advantageous herein if the core plate comprises closed-cell foamed, cross-linked polyolefins, preferably of closed-cell foamed cross-linked polyethylenes of like or unlike density.

BRIEF DESCRIPTION OF THE DRAWING

An example of the tumbling and exercise mat pursuant to the invention is illustrated in a partially cut-away perspective view in the FIGURE and is described in greater detail below.

DETAILED DESCRIPTION OF THE INVENTION

The gym mat according to the FIGURE comprises the core of one or of a plurality of layers 1,1' of a closed-cell foamed synthetic material with soft elastic properties. On the surface the core is laminated with a textile sheeting and/or a film 3, while the underside is covered with an antiskid netting or sheeting of rubber or a synthetic material 2. Lamination is effected by flame, as adhesives would produce too high an additional weight.

The use of a closed-cell foamed cross-linked polyolefin has proven to be particularly advantageous with respect to the construction of the core because such foams, with no perceptible aging behavior, have an outstanding dynamic cushioning action. With the use of a closed-cell foamed cross-linked polyethylene, a core layer thickness of 20 mm is already sufficient, for example, for the attainment of satisfactory service properties in average use. If the core layer is in addition constructed two-layered, the lower layer for example having a greater density than the top layer, then the mat acquires a progressive cushioning action which to an extraordinary extent makes it equally suitable for use under the most varied of stresses, for example for gymnastics with or without equipment.

For the structure of the mat surface, particular foamed or unfoamed films of elastomer materials are suitable wherein said films, if necessary, may alternatively have graining or embossing. Frequently, however, lamination with a textile sheeting is preferable, for example if the mat is used predominantly as an exercise mat. In principle, all carpet grades are suitable regardless of their design or the types of fiber used. Preferable, however, are general grades which are characterized by a particularly nappy and soft surface with simultaneous tread resistance.

The covering of the underside of the tumbling and exercise mat pursuant to the innovation may be expected in particular to improve its skid safety. Shown to be particularly suitable has been the lamination of a netting of foamed or unfoamed synthetic material of a soft elastomer material on a rubber base where, in particular, a mesh size of between 5 and 15 mm has been found to be particularly advantageous.

The special advantage of the tumbling and exercise mat pursuant to the innovation resides in the fact that the mat, despite an extraordinarily small weight per unit area, has an outstanding dynamic cushioning action. All embodiments are readily rollable and their transport by children, even in the case of large dimensions, is assured without any problem.

In a preferred embodiment, layers 1 and 1' have a range of thickness of about 10 to 20 mm with a density of about 30. Film 3 may have a range of thickness from about 2 to 4 mm. For the above-mentioned ranges of thicknesses and densities of the layers 1 and 1' each layer would have a weight in a range from about 300 to 900 g/m2.

It will be appreciated that the instant specification and examples are set forth by way of illustration and not limitation, and that various modifications and changes may be made without departing from the spirit and scope of the present invention.

What is claimed is:

1. A lightweight exercise and tumbling mat comprising a core comprising a plurality of layers laminated together, each layer composed of a closed-cell foamed synthetic material with soft elastic properties, wherein the plurality of layers have a progressively greater density towards the underside, at least one of a textile sheeting and a film on the surface corresponding to the top and a nonskid sheeting comprising an open mesh netting of rubber or synthetic material on the underside of the core.

2. The mat according to claim 1 wherein the core comprises closed-cell foamed cross-linked polyolefins.

3. The mat according to claim 3 wherein the polyolefins are closed-cell foamed cross-linked polyethylenes of unlike density.

* * * * *